UNITED STATES PATENT OFFICE.

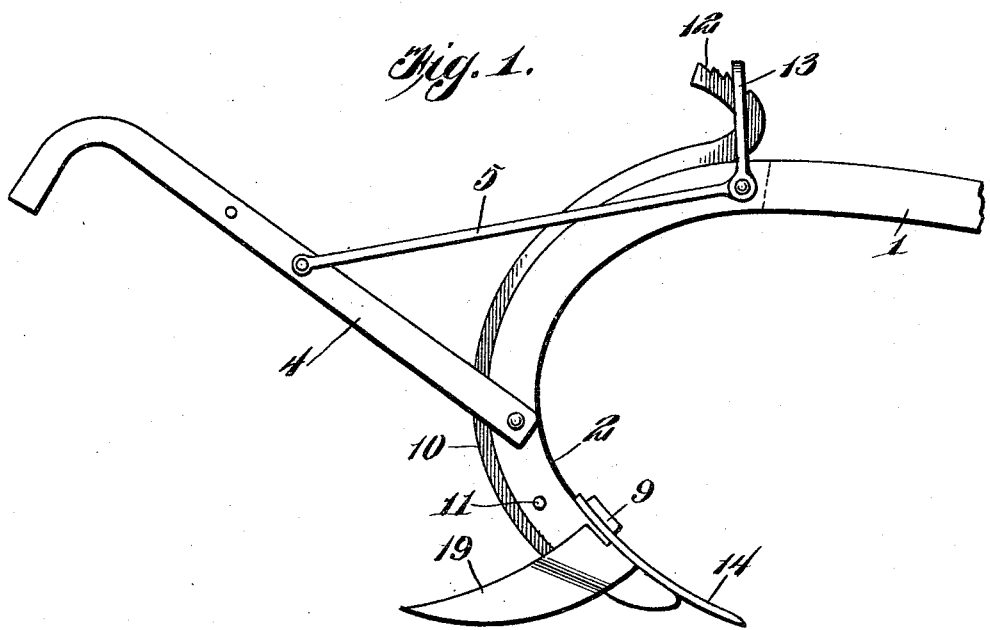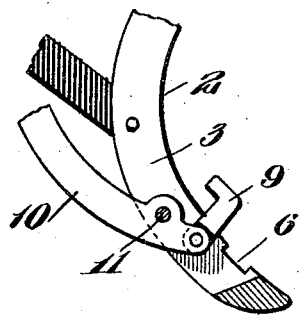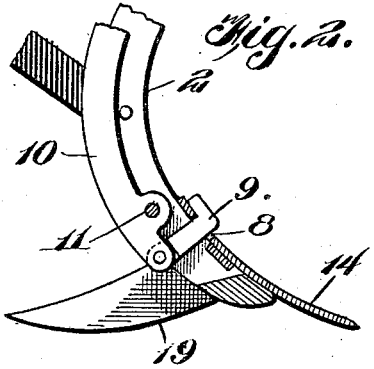

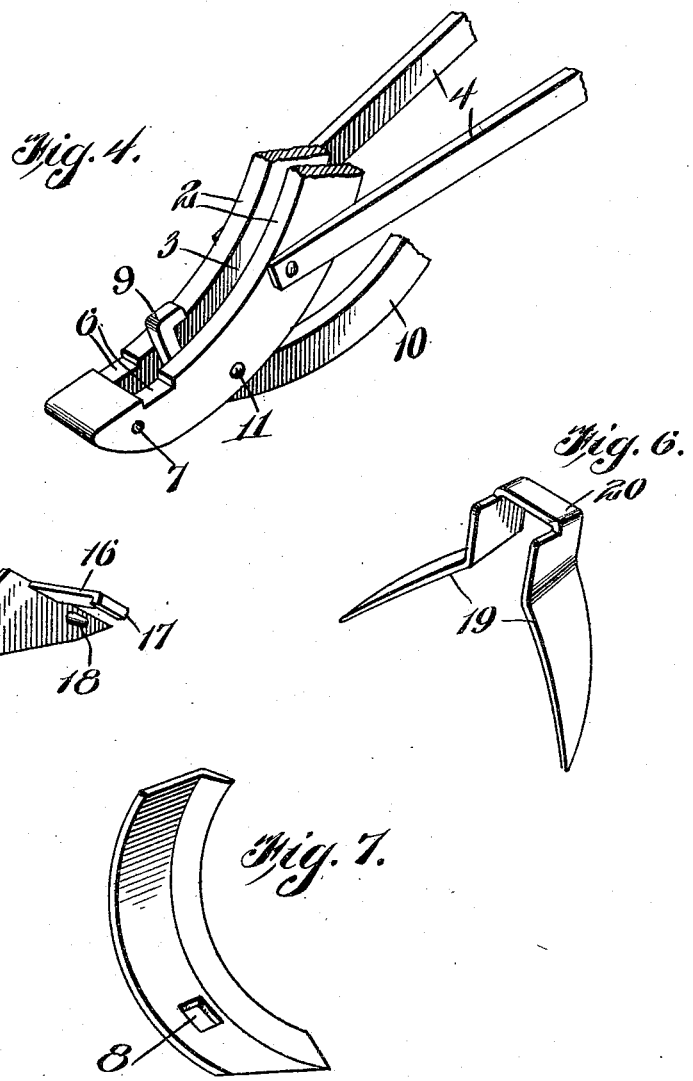

SAMUEL OSCAR SMITH AND JAMES W. CAMPBELL, OF FALCO, ALABAMA; SAID CAMPBELL ASSIGNOR TO SAID SMITH.

PLOW.

1,169,879.  Specification of Letters Patent.  Patented Feb. 1, 1916.

Application filed April 29, 1914. Serial No. 835,230.

*To all whom it may concern:*

Be it known that we, SAMUEL OSCAR SMITH and JAMES W. CAMPBELL, citizens of the United States, residing at Falco, in the county of Covington and State of Alabama, have invented new and useful Improvements in Plows, of which the following is a specification.

The invention has relation to the type of agricultural implements generally designated as a plow and which is constructed for a variety of work being supplied with shovels of various shapes which are adapted to be interchangeably secured to the standard.

The present invention relates more particularly to the fastening means for securing the shovels or like earth treating device to the standard whereby the substitution of one shovel for another may be easily and quickly effected and the shovel in position made secure against accidental loosening or displacement by the ordinary use of the implement when in operation.

The invention consists of the novel features, details of construction and combination of parts, which hereinafter will be more particularly set forth, illustrated and claimed.

In the drawings hereto attached:—Figure 1 is a side view of an implement having a shovel and sweep fitted to the standard. Fig. 2 is a sectional view of the lower portion of the standard showing more clearly the fastening means for securing the shovel and sweep or like part in position. Fig. 3 is a view similar to Fig. 2 showing the relation of the parts when the catch is in position to admit of the shovel being placed in position or removed from the standard. Fig. 4 is a detail perspective view of the lower portion of the standard showing more clearly the seat for receiving the shank of the sweep, landside, runner or like part. Fig. 5 is a detail view of the runner or landside. Fig. 6 is a detail view of a double sweep or scraper. Fig. 7 is a detail view of a different form of shovel or like earth treating tooth or part.

Corresponding and like parts are referred to in the following description, and indicated in all the views of the drawings, by the same reference characters.

The implement is of the type embodying a beam 1 and standard 2. These parts may be of ordinary construction. As illustrated, the beam and standard are of integral formation, the standard being formed with a slot 3 to receive the fastening means whereby the various shovels, earth treating devices or like parts are retained in place. Handle bars 4 are attached at their lower ends to the standard 2 and braces 5 connect such handle bars with the beam. These parts may be of any construction and arrangement according to the style of implement to which the invention is adapted. A recess 6 is formed in the front side of the standard near its lower end and extends transversely of the standard from one side to the other and constitutes a seat to receive the shank of the sweep, runner, landside or other analogous part. An opening 7 is formed in a side of the standard 2 near the recess or seat 6 and is adapted to receive a pin or stud of the landside, runner or like part that may be placed in position. The various forms of types of shovels, earth treating devices or like parts are formed with openings 8 which are adapted to receive the catch or fastener 9 by means of which such shovels or similar parts are secured to the standard. The catch or fastener 9 preferably consists of a hook and is pivoted to the lower end of the lever 10 which is arranged to operate in the slot 3 and is secured to the standard by means of a pin or pivot fastening 11. The lever 10 curves to conform to the outline of the standard 2 so as to enter the slot 3 thereof and not be in the way or noticeable when the implement is in operation or adjusted for service. The catch 9 operates in the slot 3 and its hooked end is adapted to pass through the opening 8 of the various shovels. The upper end of the lever 10 is formed with a tooth portion 12 which is adapted to coöperate with a latch 13 whereby the lever is secured in the adjusted position.

The latch 13 is pivoted to the beam 1 and is preferably of U-form so as to insure a substantial fastening means for the lever and the latter possesses sufficient inherent resiliency to permit its toothed portion to be readily engaged with or disengaged from the latch, and to be held securely thereby when in engaged relation. The teeth shown at 12 are preferably of the well known ratchet or saw tooth shape in order that accidental disengagement of the toothed portion with respect to the latch 13 will be prevented. It will be readily seen that, assuming the parts to be in assembled relation, as seen in Fig. 1, by bearing downward on the top portion of the lever 10 the latch 13 may be thrown forward, thereby releasing the lever and permitting its upper end portion to be moved rearward, thereby. When the upper end of the latch 13 is thrown forward the lever 10 is released and its upper end may be moved rearward thereby throwing the catch 9 forward and releasing the shovel or like part held thereby. By having the catch 9 pivotally connected to the lever 10 such catch may be readily manipulated to pass its hooked end through an opening 8 of the shovel or like earth treating device or part both when placing such shovel in position or removing it from the standard. The sweep, runner, landside or other like part is formed with a shank which is fitted in the recess or seat 6 and is retained therein by the shovel or like part overlying the same and secured to the standard by means of the catch 9 in the manner stated. It will be convenient to take up each member in turn, and in the following paragraph reference will be made respectively to the sweep, runner, or landside; and the formation of its recess engaging shank explained.

The numeral 14 designates generally the shovel, earth treating device or analogous part which is adapted to be removably fitted to the standard 2 such part having the form best adapted for the particular work in hand thereby admitting of the implement being used as a plow, a cultivator, cotton sweep or the like.

The numeral 15 designates a landside, runner or like part, the same being placed against a side of the standard 2 and having a laterally extending shank 16 which is adapted to fit within the seat 6, such shank having its outer end bent as indicated at 17 to extend along the opposite side of the standard and thereby prevent lateral displacement of the part 15. A stud 18 projects laterally from the part 15 and is adapted to enter the opening 7 formed in the side of the standard 2 thereby relieving the shank 16 of excessive strain.

The numeral 19 indicates a double sweep, the members of which are connected by means of a cross piece 20 which corresponds with the shank and is adapted to enter the recess or seat 6 and be retained therein by the overlying shovel or like part 14.

It will be seen that the shank portion 16 or 20, as the case may be, when seated in the transverse recess 6 of the standard, constitutes an obstruction whereby the pivotal movement of the hook or catch member 9 in a downward direction will be limited, thereby preventing the possibility of said catch member being accidentally disengaged from the slot in the superposed blade or shovel. It will, therefore, be seen that the obstructing element occupying the recess 6 is an essential feature of the device.

It will be understood from the foregoing taken in connection with the accompanying drawings that the invention is of such a nature as to admit of a shovel, landside or like part or parts being easily and quickly placed in position or removed, since no bolts or nuts are required to be removed or loosened, the construction admitting of the catch or fastener 9 being instantly released or made secure so that the required part may be placed in position or removed with the greatest facility.

From the foregoing description, taken in connection with the accompanying drawings, the advantages of the construction and of the method of operation will be readily apparent to those skilled in the art to which the invention appertains, and while we have described the principle of operation of the invention, together with the device which we now consider to be the best embodiment thereof, we desire to have it understood that the device shown is merely illustrative, and that such changes may be made when desired as are within the scope of the invention as claimed.

Having thus described the invention, what is claimed as new is:—

1. In an implement of the character described, the combination with a slotted standard having a transverse recess, a lever fulcrumed in the slot of the standard, a hook-shaped catch connected pivotally with the lever and extending beyond the face of the slotted standard, a plow shovel having a slot engaged by the hook-shaped catch, an obstructing member seated in the transverse recess and limiting the pivotal movement in a downward direction of the hook-shaped catch, and means for locking the lever in adjusted position.

2. In an implement of the class described, a beam having a curved slotted standard provided with a transverse recess, a lever fulcrumed in the slot of the standard and having a pivoted hook-shaped catch projecting beyond the face of the standard, an implement having a shank seated in the transverse recess in the path of the pivoted catch, and a shovel having a slot engaged by the pivoted catch, said lever having a toothed portion, and said lever possessing inherent resiliency; and a U-shaped catch pivoted on the beam to engage the toothed portion of the lever.

3. In an implement of the character described, the combination with a slotted standard having a transverse recess in its front side near its lower end, and provided with an opening in one side near said recess, of a member having a shank adapted to engage the transverse recess, said member having also a laterally projecting stud engaging the opening near the recess, and means for securing said member in position, said means including an operating lever fulcrumed on the standard, a hook-shaped catch pivoted on said lever, and means for securing the lever in adjusted position.

In testimony whereof we affix our signatures in presence of two witnesses.

S. OSCAR SMITH.
JAMES W. CAMPBELL.

Witnesses:
J. A. CONWAY,
J. A. STEELE.

Copies of this patent may be obtained for five cents each, by addressing the "Commissioner of Patents, Washington, D. C."